(12) United States Patent
Wilhelm et al.

(10) Patent No.: US 7,405,523 B2
(45) Date of Patent: Jul. 29, 2008

(54) REMOTE CONTROL OF LIGHTING

(76) Inventors: William George Wilhelm, 34 Pine Ct., Riverhead, NY (US) 11901; Paul Savage, 85 Cabot Ct., Hauppauge, NY (US) 11788

( * ) Notice: Subject to any disclaimer, the term of this patent is extended or adjusted under 35 U.S.C. 154(b) by 403 days.

(21) Appl. No.: 11/265,764

(22) Filed: Nov. 2, 2005
(Under 37 CFR 1.47)

(65) Prior Publication Data
US 2007/0170870 A1 Jul. 26, 2007

(51) Int. Cl.
*G05F 1/00* (2006.01)
(52) U.S. Cl. ............... 315/291; 315/247; 315/307; 315/312; 315/158; 345/82; 345/52; 345/77
(58) Field of Classification Search ......... 315/157–162, 315/247, 291, 307, 169.1, 169.3, 294, 312–315; 345/46, 52, 77, 81, 82; 307/38, 39
See application file for complete search history.

(56) References Cited

U.S. PATENT DOCUMENTS

| 4,208,579 | A | * | 6/1980 | Scrivo et al. | 250/227.22 |
|---|---|---|---|---|---|
| 6,297,724 | B1 | * | 10/2001 | Bryans et al. | 340/3.51 |
| 6,528,782 | B1 | * | 3/2003 | Zhang et al. | 250/226 |
| 2007/0080911 | A1 | * | 4/2007 | Liu et al. | 345/82 |
| 2007/0228999 | A1 | * | 10/2007 | Kit | 315/291 |

* cited by examiner

*Primary Examiner*—Haissa Philogene
(74) *Attorney, Agent, or Firm*—Alfred M. Walker

(57) ABSTRACT

An electronic ballast system controls one or more ballasts of HID or fluorescent lamps, which are controlled in an "on/off" manner by a ultra low power controller that is isolated for a primary power circuit or derives its very low switch power from the ballast itself. The on/off control provides a near lossless control system. This system may be applied to electronic ballast for operates at fractional power levels corresponding to different lighting intensities and with conventional occupancy sensors. The system may also be applied to other electronically compatible end-use devices and applications.

6 Claims, 9 Drawing Sheets

REMOTE CONTROL OF LIGHTING

RELATED APPLICATIONS

This application is based in part upon provisional patent application Ser. No. 60/293,707, filed May 21, 2001, and upon application Ser. No. 10/779,291, filed Feb. 13, 2004, which was a continuation of application Ser. No. 10/153,522, filed May 22, 2002, now U.S. Pat. No. 6,693,395.

FIELD OF THE INVENTION

The present invention relates to a system and device for low power consumption of on/off control of a single or a plurality of electronic ballasts that can be used for a variety of lighting functions.

BACKGROUND

Electronic ballasting of gas discharge lighting has become the leading option over passive reactive ballasting. Gas discharging lighting includes fluorescent and high intensity discharge (HID) lamps. Electronic ballasts are constructed with active electronic components such as transistors that allow functional electrical control. The normal operation of the ballasted lights requires them to be energized or de-energized corresponding to "on and off" operation. This is usually accomplished by an external mechanical switch, which applies or interrupts electrical power to the ballast and corresponding causes the lamp(s) to go on or off.

The ballast operating current and voltage that powers the ballast must be experienced by this power switch which for safety reasons is under restrictions governed by building code wiring requirements for safety. Because of the special knowledge associated with such power wiring a costly professional electrician is formally required to alter any switching control within a given building space.

There are a number of limitations associated with this common means for on/off control. First the control switch must support the current requirements of all the lighting in a given area, so for large areas, the current carrying capacity of the switch must be raised to accommodate the greater load currents of the lighting. When this happens the power switching arrangement becomes complex with power switching implemented through a combination of mechanical and electric relays (contactors) that increase to hardware needs, increase expense and reduced reliability of the system.

Another limitation occurs if the switch is very remote and distant for the lights, requiring the lighting load current to pass to and from the remote switch causing an undesirable electrical loss corresponding to resistive voltage drops. Additionally, such a system is inflexible to alterations and modifications, essentially requiring the special training and experience of higher cost electric contract service assistance, to alter a switching arrangement, or to add automated remote functions to the lights.

OBJECTS OF THE INVENTION

It is therefore an object of this invention to cause a ballast to be energized in satisfaction of the "on/off" control, by an ultra low power controller that may be essentially isolated for primary power circuit or derive its very low switch power from the ballast itself. With this invention it is possible to effect on/off control with the lowest voltage and current for an essentially near lossless control means. The invention can be used with lighting ballasts, but also for any devices with on/off switches, such as motors, appliances, heaters and the like. In particular, the invention can be used for non-ballasted electric lighting such as incandescent lamps, halogen lamps, and light emitting diodes.

It is also an object of this invention to use its on/off control means to effect other desirable functions in the electric ballast. Such functions include but are not limited to electronic action that would cause the electronic ballast to operate at fractional power levels corresponding to different lighting intensities and/or with conventional occupancy sensors.

It is a further object of this invention to utilize wiring components in the on/off control that correspond to the domain of signal or control wiring and which are characterized by very low power requirements and do not have the restrictions associated with power wiring. Such wiring is common in the telecommunications industry and may be applied to external programmed control.

SUMMARY OF THE INVENTION

In keeping with these objects and others which may become apparent, the present invention is a ballast or power electronics module which is controlled by a remotely located switch function with a low amount of control current and little power loss. This is effected by means of a photo-isolator interfacing circuit within the ballast or within the power electronics module that provides high electrical isolation between an external control signal current and the power electronics of the ballast. The photo-isolator is the switch interface from signal level to power level control.

The on/off switching system can be used for one or more electronic ballasts for one or more lamps, of one or more lighting fixtures. The system includes the one or more ballasts having power electronics, wherein the system further includes a remote switch function in each ballast, which remote switch function is remotely located apart from each ballast. The remote switch function operates with a low amount of control current and little power loss. This on/off switching system further includes one or more connections connecting the remotely located switch to a ballast resident opto-isolator circuit, with associated interfacing electronics within each ballast. Therefore, each ballast provides high electrical isolation between the external switch function and the ballast power electronics to each lamp.

Besides its use with lighting ballasts, the remote on/off switching function system can also be used for one or more electronically interfaceable end-use appliance devices which function through on/off control. For example, the devices can include motors, heaters, appliances, industrial electrical equipment or other appliances which benefit from proportional on/off control as a means for power modulations. Additional examples include electrical lighting fixtures which do not use ballasts, such as incandescent lamps, halogen lamps, and light emitting diodes. In these embodiments for other devices, each device has an on/off switch function, as well as power electronics, wherein the remote switch function is remotely located apart from the device's resident power electronics, wherein further the remote switch function operates with a low amount of control current and little power loss. This on/off switching system further includes one or more connections connecting the remotely located switch function to an opto-isolator circuit with high electrical isolation to the power electronics. The power electronics provides electrical computability between the switch function and the operation of the device. The remote switch for low-power on/off control of non-ballasted lighting, namely light emitting diodes and halogen lamps, may include:

a) a remote switch connected to at least one non-ballasted lighting unit;
b) at least one power supply providing DC power;
c) a controller interfacing with a remote switch communicating with the non-ballasted lighting unit;
d) the aforementioned controller including a DC-DC converter to reduce the voltage from a predetermined voltage supplied by the aforementioned power supply to a second predetermined voltage required by the aforementioned at least one non-ballasted lighting. For example, the at least one nonballasted lighting unit may be a light emitting diode or clusters thereof, a halogen lamp, or clusters thereof. The aforementioned at least one power supply may optionally be a dual system incorporating two separate power supplies with separate DC power sources, wherein on/off control is activated by a single remote switch interfaced to the aforementioned controller. This controller may optionally be a master controller and a low-power signal line from this master controller sends a control signal to a second system of this dual system incorporating two separate power supplies with separate DC power sources.

The remote on/off switching system can be applied for proportional light dimming control having as its interface an optically isolated on/off function interfacing with remote circuitry, providing pulse width modulation to the optically isolated interface control, to cause proportional light dimming. The remote circuitry includes a fixed frequency oscillator influenced by a pulse-width modulator controlled by a voltage setting, wherein proportional pulses cause constant current to flow remotely through a light emitting diode in an optical isolator in the electronic ballast, wherein a constant current driver insures a predetermined proper current to the light emitting diode in compensation for variable cable lengths. A phototransistor/switch of the optical isolator complies with the periodic "on" duty cycle set remotely and causes the power in the ballast circuitry to be applied to the lamp with variable intensity.

A similar on/off switching system can be applied to one or more electrical end-use appliances compatible with electronic on/off control in which a similar optically isolating interface utilizing circuitry influences very low power remote control of power levied in the various end-use appliances such as motor driven devices, electrical heaters, industrial equipment, non ballasted electric lighting fixtures and any other device that might benefit from proportional on/off control as a means for power modulation.

The singular switch can also control a plurality of ballasts including but not limited to ballasts applied to a plurality of HID or fluorescent lamps. This switching function can also be applied to programmed interruption such as in controlled blinking functions which are used as an attraction in lighted advertising signs.

Optionally, an external repetitive control may be applied that causes the "on" periods to be different from the "off" period such that power to the lamp is proportional to the on period. The said interface thus becomes a means for dimming with external singular functional control eliminating costly internal dimming control circuitry.

Furthermore, the external remote switch function may be provided through active electronic, such as, in part, a transistor. In addition, the remote switching function can be provided by a programmable electronic system, with or without feedback.

A plurality of lead wires connects the remote switch function, a low current power source, and the light emitting diode (LED) is available at the input of the opto-isolator. The low current power source can be derived from the ballast, or it can be supplied externally.

Although the connectors for the control of the ballast may be any signal type connector, a modular phone jack and plug and the use of the flat conductor cable, common to telephone systems, as the plurality of lead wires facilitates installation.

Through the use of a common four wire 3-way RJ11 telephone coupler at each ballast and a length of flat 4-conductor telephone cable with reversed RJ11 plugs at each end (i.e. a reversed cable net) any number of ballasts can be connected in daisy-chain fashion to be controlled by a single remote switch. Adding, rerouting, or reconfiguring switches to control a network of light fixtures can be accomplished without the need of an electrician.

The electrically isolated photo-transistor portion of the opto-isolator is controlled by light emitted by the LED within the opto-isolator. The state of conduction of its collector-emitter junction is used to electronically control the operation (in an on/off fashion) of any standard high frequency electronic inverter circuitry used to derive AC power of any frequency to the fluorescent or HID lamps.

BRIEF DESCRIPTION OF THE DRAWINGS

The present invention can best be understood in connection with the accompanying drawings, in which.

DETAILED DESCRIPTION OF THE INVENTION

Figure 1:
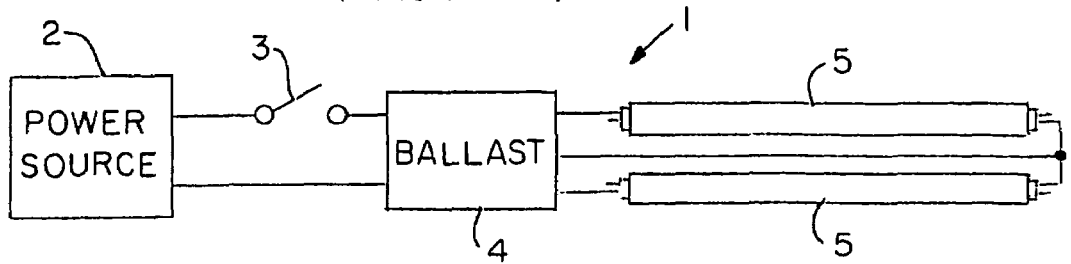
FIG. 1 is a Prior art block diagram of the common method for switching a lighting ballast.

A block diagram of a prior art lighting circuit 1 is shown in Figure I. A power source 2 is used to power ballast 4 which operates two gas discharge (fluorescent) lamps 5. On/off control of the lamps is influenced by mechanical switch 3 which must be rated for the full supply voltage and current requirements of the lamp load, when multiple ballasts are used in parallel. A long distance from switch 3 to ballast 4 requires evaluation of the effects of the consequent voltage drop. In most jurisdictions, the initial switch wiring as well as any alterations is legally performed only by a licensed electrician.

Figure 2:
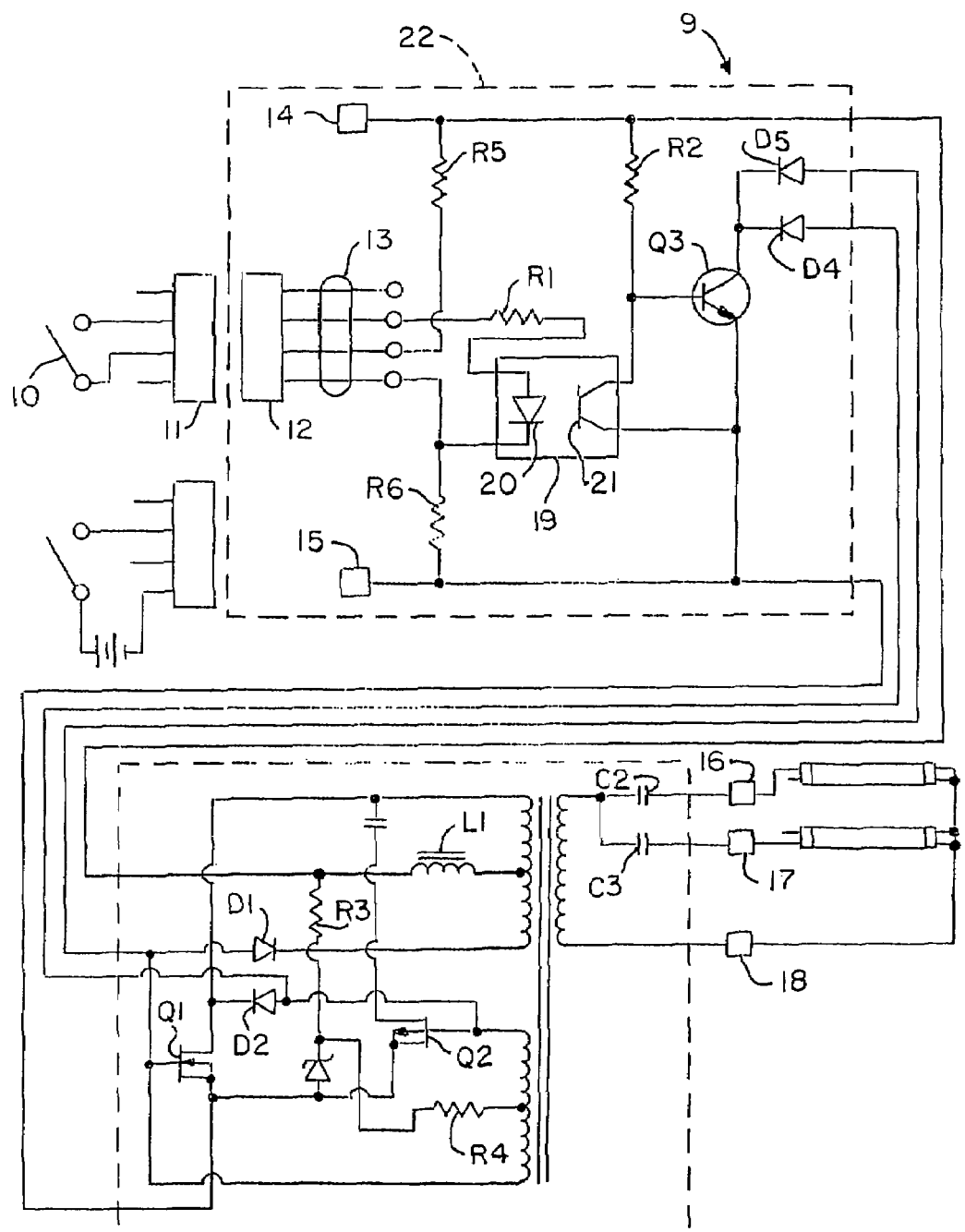
FIG. 2 is a Schematic diagram of an electronic ballast of this invention with optically isolated power control.

FIG. 2 is a schematic diagram of an electronic ballast 9 of this invention. A control switch 10 is wired to connector 11. A cable (not shown) connects connector 11 to connector 12; this could be a long distance. A length of flat 4-conductor telephone or any corresponding signal type cable 13 goes from connector 12 to connections within ballast 9. Terminals 14 and 15 supply input power to ballast 9. Output terminals 16 and 17 connect to each of two lamps (not shown.) while connector 18 is common to each of the lamps.

FIG. 2 also shows that the key element that distinguishes this ballast from, other electronic ballasts is the use of an electronic optical isolator component 19 which includes a matched pair of light emitting diode (LED) 20 and photo transistor 21. A internal low voltage and low current supply source for energizing LED 20 may be optionally derived from resistors R5 and R6 which are connected in the ballast internally to the power input supply terminals 14 and 15. When using the internal power source LED 20 is energized when remote switch 10 is closed causing limited power supply current to flow through supply terminals 14 and 15, resistor R1 and LED 20, causing LED 20 to forward bias transistor 21 into conduction. Conducting transistor 21 causes transistor Q3 to stop conducting which reverses biases diodes D1 and D2 conduct, allowing the gates of the transistors in the power oscillator portion of the circuitry 23 in ballast 9 to function in an un-impeded or power "on" mode.

Schematic section 23 (indicated by a dashed line box) serves to typify a standard high frequency inverter circuit used to energize a fluorescent lamp. A similar circuit may be applied to the operation of a HID lamp with emphasis applied to the essential functions of this invention.

Schematic section 22 (indicated also by a dashed line box) is new circuitry related to remote on/off switching, control of one or more ballasts, except for subcircuit 19, which is depicted within the confines of schematic section 22, which is a reverse polarity protector.

Ballast 9 is designed for use with DC power input at terminals 14 and 15.

Reference numeral 19 is a commercial photo-isolator integrated circuit that is capable of providing high electrical isolation between an external control signal and the power electronics in ballast 9.

To turn on ballast 9, a voltage which is either internally generated (as shown) or externally supplied (shown in drawing FIG. 8 herein) is applied to isolator 19 LED 20 and current limited by resistor (R1); light is emitted by LED 20 which excites photo transistor 21 to conduct (i.e.—reduce resistance). This causes current to flow in resistor R2. With resistor R2 and isolator transistor 21 forming a voltage divider, the conducting opto-isolator 19 transistor 21 causes the base-emitter voltage on transistor Q3 to go below conduction, causing the collector-emitter junction on transistor Q3 to become highly resistive (non-conducting). With transistor Q3 non-conducting, there is no current path for diodes D4 and D5 to the power supply return allowing the gates of transistors Q1 and Q2 to remain in a high impedance state and thus unencumbered to function as part of the self-excited power oscillation inverter servicing the gas discharge lamps. A typical example of a transistor, such as transistor Q1 and transistor Q2, is a field effect transistor.

Alternatively, no voltage on the input of opto-isolator 19 reverses the process described above and causes the gates of transistors Q1 and Q2 to be clamped to the potential of the power supply return.

This effectively causes transistors Q1 and Q2 to be placed in a non-conductive state. This action interrupts the power oscillator/inverter causing the lamps to go off.

Thus it can be seen that a low voltage, low current interface controlled by a remotely located wall-mounted switch 10 can be used to control the operation of an electronic ballast to turn lamps on or off. Since each LED 20 just draws a few milliamperes of current, long distance to a remote switch are irrelevant since any voltage drops is insignificant.

Figure 3:
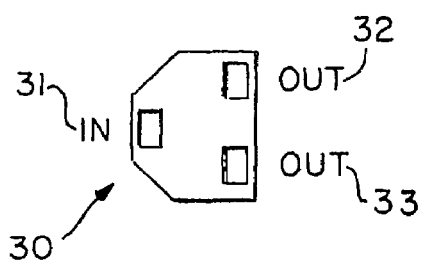
FIG. 3 is a Top plan schematic view of a common type RJ11 four wire 3-way coupler.

While any low voltage connector wire can be used, for convenience and low cost, the use of modular connectors and light weight 4-conductor cable from the telephone industry is part of the preferred embodiment of this invention. For example, FIG. 3 shows a standard telephone RJ11 four wire 3-way coupler 30. This has an input port 31 and two identical output ports 32 and 33 internally wired to maintain terminal correspondence for each of the four terminals in each port.

Figure 4:
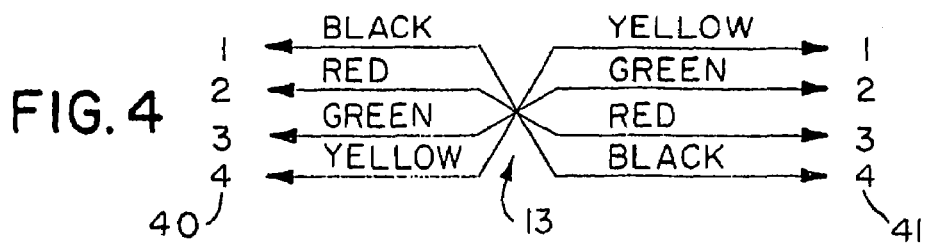
FIG. 4 is a Schematic Contact representation of a reversed 4-wire reversed cable set common to the telephone industry.
Figure 5:
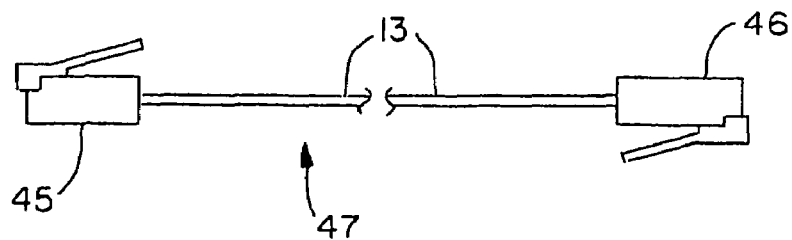
FIG. 5 is a Side elevation view of a reversed cable set.

Cable 13 spans between cable end connectors 45 and 46, forming together reversed cable 47 of FIG. 5. Reversed cable 47 includes flat four wire cable 13 with opposing end connectors 45 and 46, wired as shown in FIG. 4, such that reference numerals 40 and 41 refer to the physical order of the respective colored wire connections 40 in cable end connector 45, and to the reversed order of colored wire connections 41 in cable end connector 46, of reversed cable 47 of FIG. 5. For example, FIG. 4 shows the configurations of opposite end contact wire connections 40 and 41 of the four colored wires of reversed cable 47, labeled "Black", "Red", "Green" and "Yellow", such that the physical order shown at contact connections 40 is used in cable end connector 45, whereas the reversed order shown at contact connections 41, labeled "Yellow", "Green", "Red" and "Black", is used in cable end connector 46. Other wire patterns can be used.

The reversed cable 47 is shown in FIG. 5 (a reversing telephone cable is common and used here, but is not required to effect this invention) while the terminal wiring is shown schematically in FIG. 4. The RJ11 cable end connectors 45 and 46 are attached to four wire cable 13 in opposite orientation (see FIG. 5) to maintain the conductor/terminal integrity shown in FIG. 4.

Figure 6:
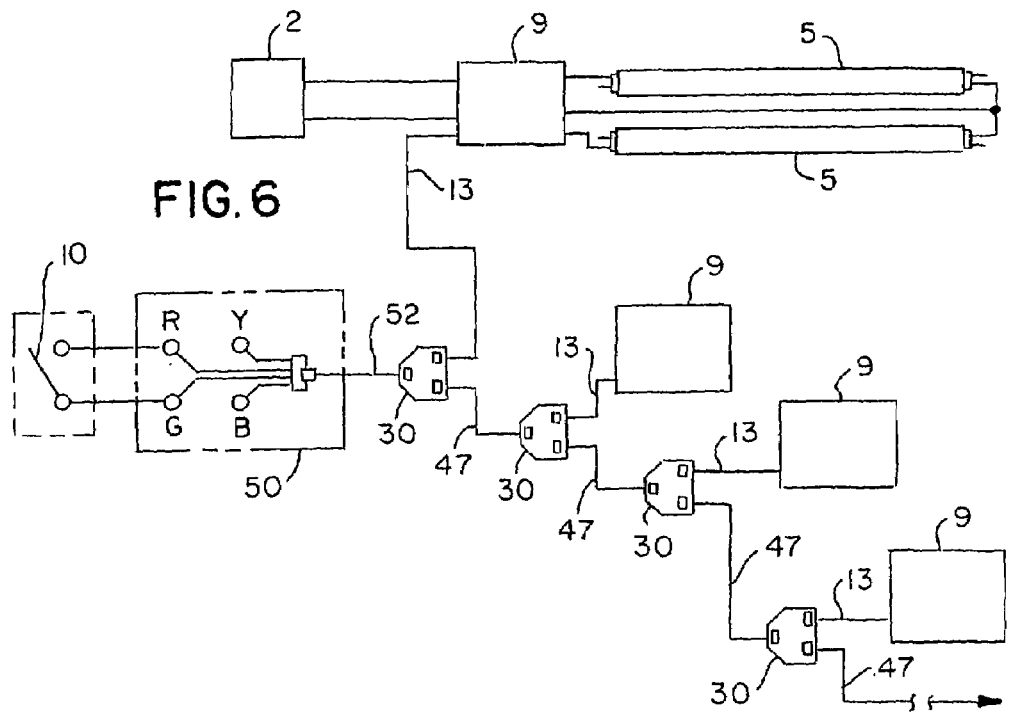
FIG. 6 is a Block diagram of multiple ballast network controlled by one switch.

FIG. 6 shows a wiring diagram of multiple ballasts 9 controlled by a single remote switch 10. A modular phone plate 50 is locally wired to wall switch 10 which attaches to the red and green wires. A long cable 52 with RJ11 cable end connectors attaches phone plate 50 to the first 3-way coupler 30. Short single-ended cable 13 plugs into either output port of coupler 30 while the other end is hard wired to ballast 9 as shown in FIG. 2. The other output port of coupler 30 is used to connect to a second ballast through reversed cable 47 and a second coupler 30 as shown.

Additional ballasts are similarly added in "daisy-chain" fashion as shown in FIG. 6. The network is extendable to a large number of individual ballasts since the only load experienced by switch 10 and long cable 52 is that of the parallel load of the LED's 20 in each of the opto-isolators 19 in each ballast 9. In this manner, 3-way couplers 30 in the vicinity of each ballast are used as extension elements to create an easy connection to the next ballast in the chain.

Figure 7:
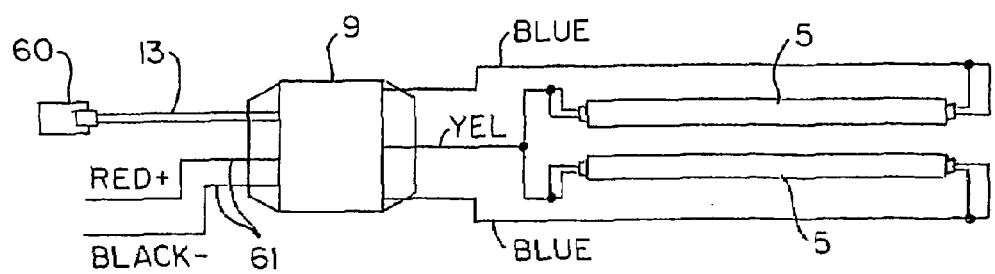
FIG. 7 is a physical layout of a electronic ballast with electrical connection for this invention.

FIG. 7 shows a physical layout of a lighting fixture using ballast 9 powering lamps 5. Short single-ended cable 13 with RJ-11 connector 60 extends from the housing of ballast 9; red and black power input leads 61 also extend from ballast 9. As shown in FIG. 6, cable 13 is plugged into 3-way coupler 30 via RJ-11 connector 60.

Figure 8:
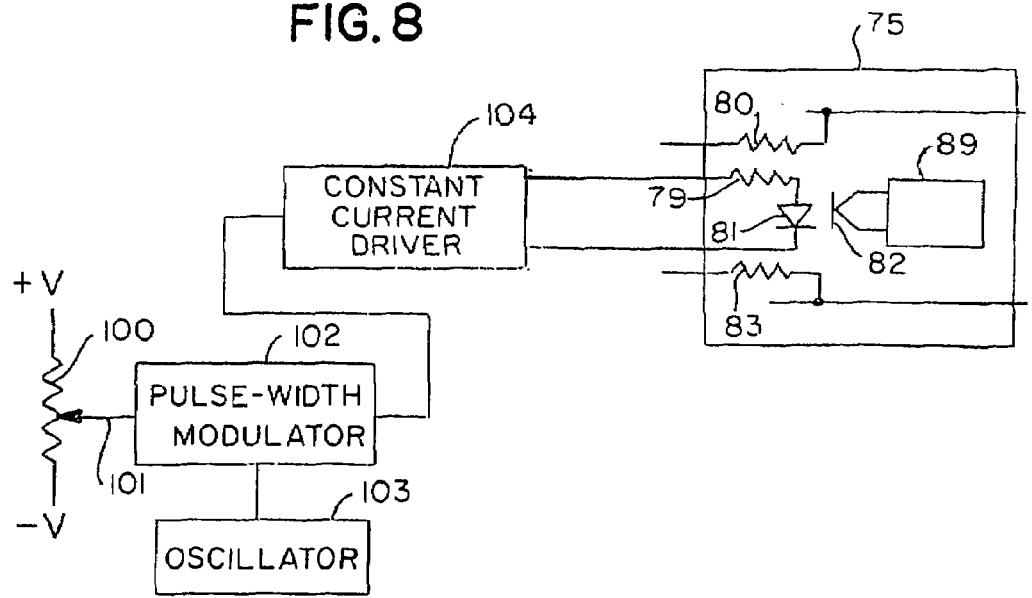
FIG. 8 is a block diagram of an alternate embodiment offering remote proportional dimming of a simple low cost electronic ballast using the on/off optically isolated interface embodied in the invention.

The block diagram of FIG. 8 is an alternate embodiment utilizing the enhanced electronic ballast 9 of FIG. 2 with the optically isolated ON/OFF control interfacing with remote circuitry providing pulse width modulation to the optically isolated ballast interface for proportional dimming control. FIG. 8 also shows a device 75 controlled by circuitry of FIG. 10.

A fixed frequency oscillator 103 feeds pulse-width modulator 102 which is controlled by a voltage setting provided by the wiper 101 on potentiometer 100.

By varying the setting, duty cycles from close to 0% to almost 100% can be derived. These pulses are fed to constant current driver 104 which interfaces remotely with the light emitting diode in optical isolator 19 which is part of electronic ballast 9. This is the same optical isolator that is used for the remote ON/OFF control described previously.

Constant current driver 104 for a series connected control system insures the proper current to the remote ballast interface 19 and any voltage drops in the long control cable. The phototransistor output of optical isolator 19 then complies with the duty cycle set remotely and varies the average power to the ballast circuitry resulting in proportional changes in light intensity.

Figure 9:
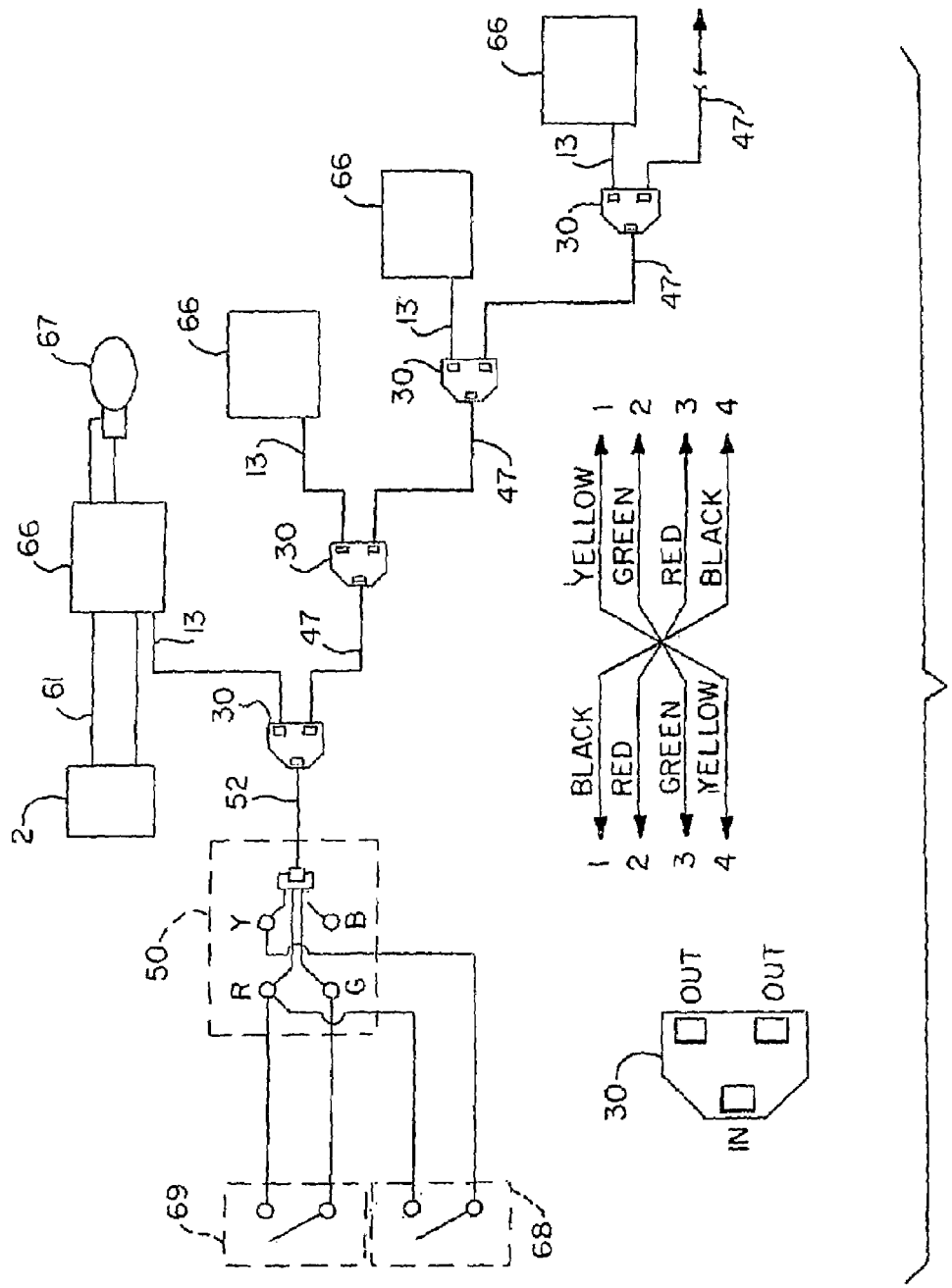
FIG. 9 is a block diagram showing use of low power external ballast control for on/off control and bi-level HID dimming functions, showing the control cabling with RJ11 connectors.

FIG. 9 shows the wiring of a network of ballasts 66. In this case, switch 68 is used for dimming and switch 69 is used for on/off control while utilizing the same 4-wire signal cable system.

Figure 10:
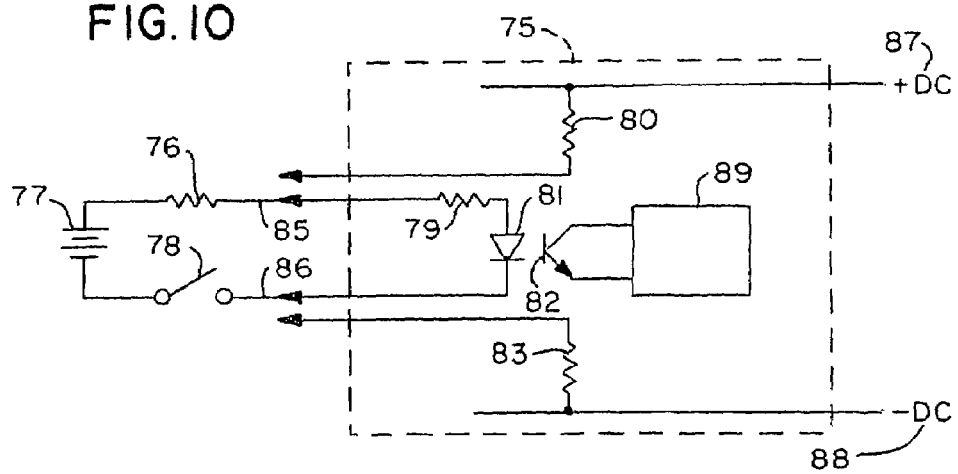
FIG. 10 shows a block diagram of a fully isolated remote switch.

FIG. 10 shows a block diagram of a fully isolated remote switch 78 with remote battery 77 and remote current limiting resistor 76 selectively supplying power to control a device 75 with function 84 therein. Long low power/voltage cables 85 and 86 operate light emitting diode (LED) 81 through further current limiting resistor 79. Resistor 76 maybe substituted with any electronic current limiting means. Phototransistor 82 is controlled by light from LED 81 into. either a conducting or non-conducting state to control function 84. Device 75 is supplied with DC power by positive (+) terminal 87 and negative (−) terminal 88. Current limiting resistors 80 and 83 may be used to support any low power remote equipment (not shown) which may not require totally isolated power.

FIGS. 11-14 illustrate the use of the remote switch of this invention for low-power on/off control of non-ballasted lighting, namely light emitting diodes and halogen lamps.

Figure 11:
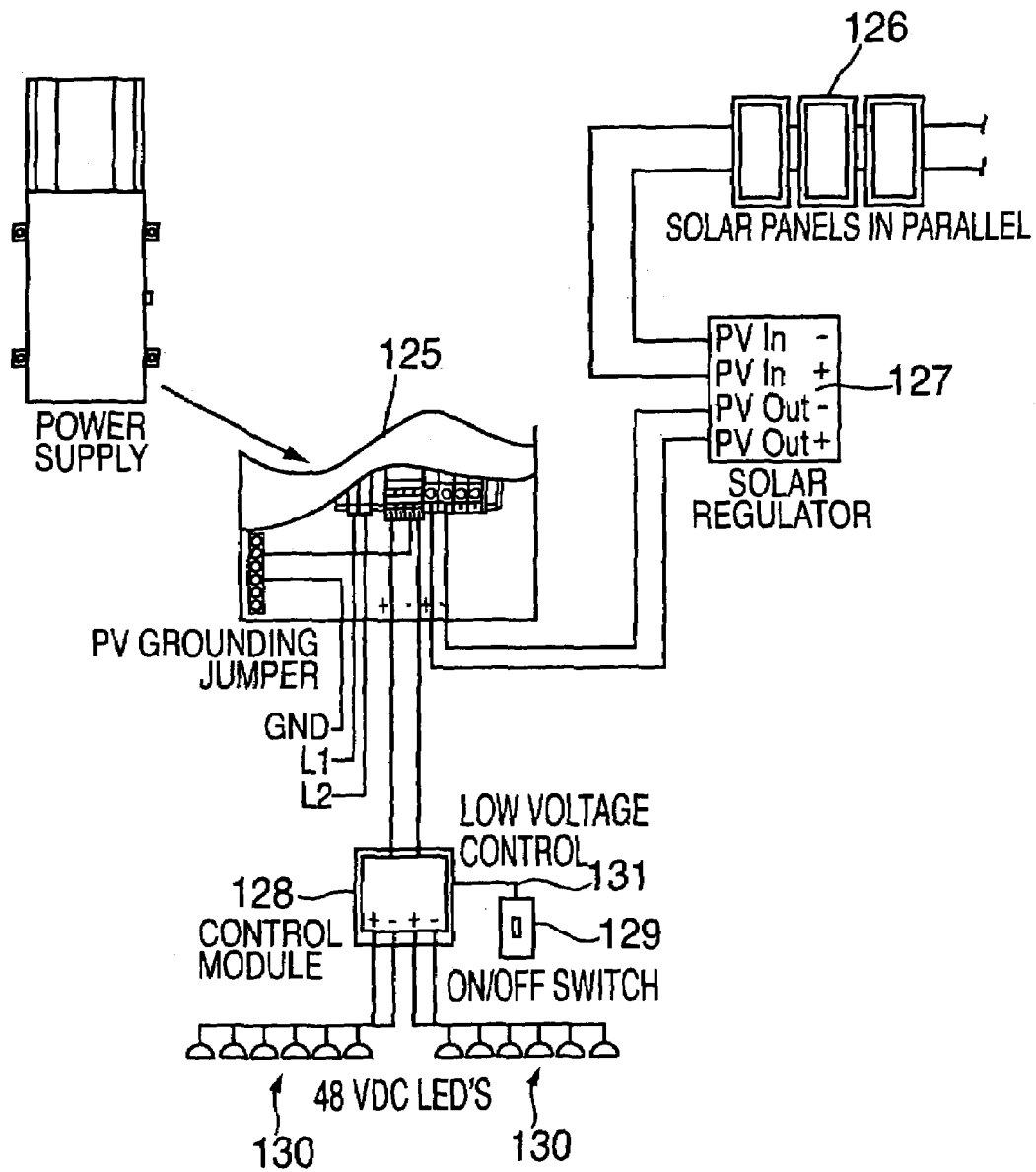
FIG. 11 shows a block diagram of a system using a remote switch of this invention in the on/off control of clusters of 48 volt LED light fixtures.

FIG. 11 shows power supply 125 which provides 48 volts DC power derived, in part, from solar panels 126 as regulated by solar panel regulator 127. Controller 128 interfaces with remote switch 129 via long low-power line 131. 48 volt DC clusters of LED lamps 130 supply high efficiency lighting; these have been made practical with the introduction of efficient white light LED'S.

Figure 12:
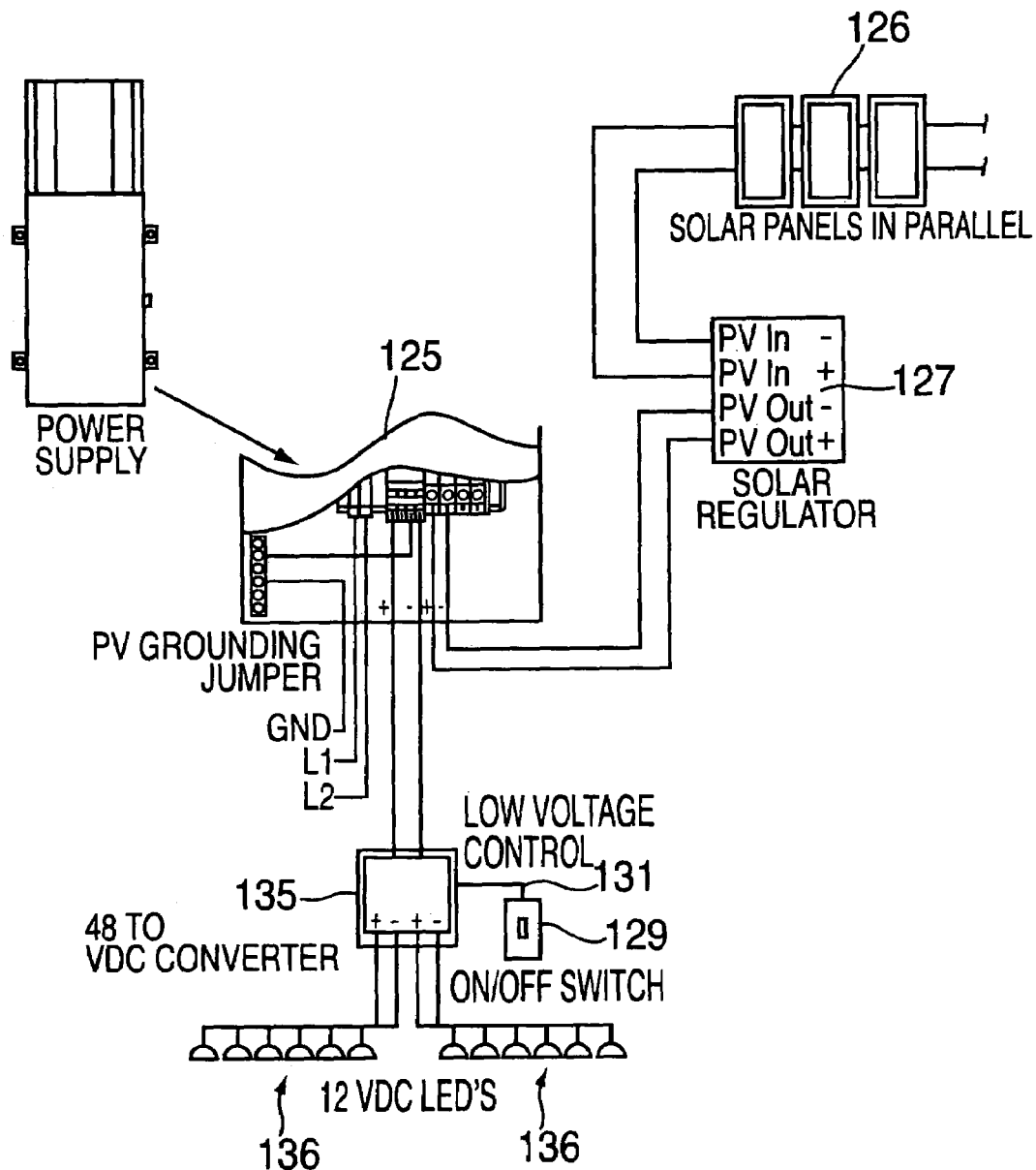
FIG. 12 is a block diagram of a system using a remote switch of this invention in the on/off control of clusters of 12 volt LED light fixtures.

FIG. 12 shows a similar configuration for powering clusters of 12 volt DC clusters of LED lamps 136. Controller 135 includes a DC-DC converter to reduce the voltage from 48 volts supplied by power supply 125 to the 12 volts required by LED clusters 136.

Figure 13:
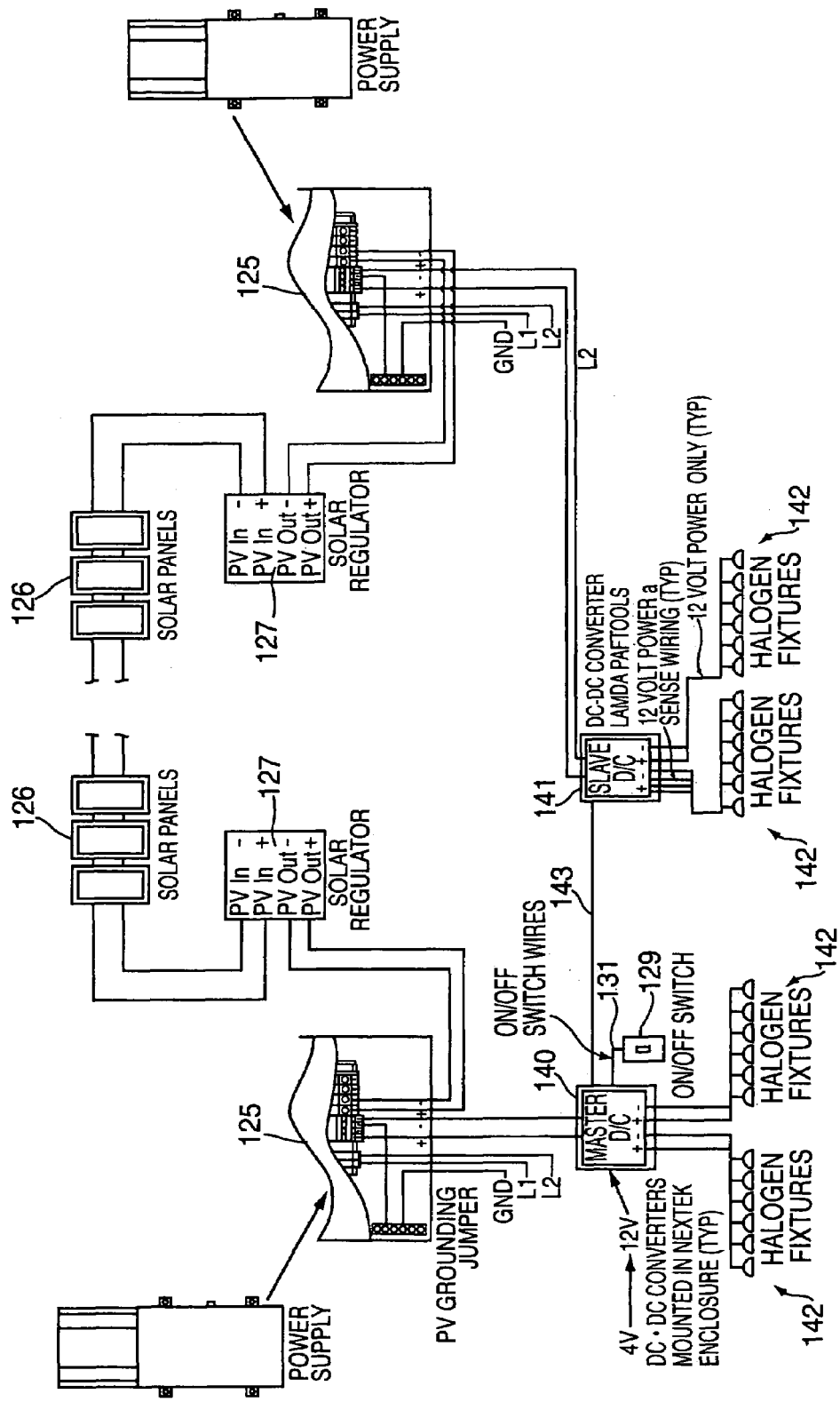
FIG. 13 is a block diagram of a system using two independent power supplies, both controlled by a single remote switch of this invention, used for supplying clusters of halogen light fixtures; and, FIG. 14 is a block diagram of a solid-state relay within a controller interfaced with a remote switch of this invention.
Figure 14:
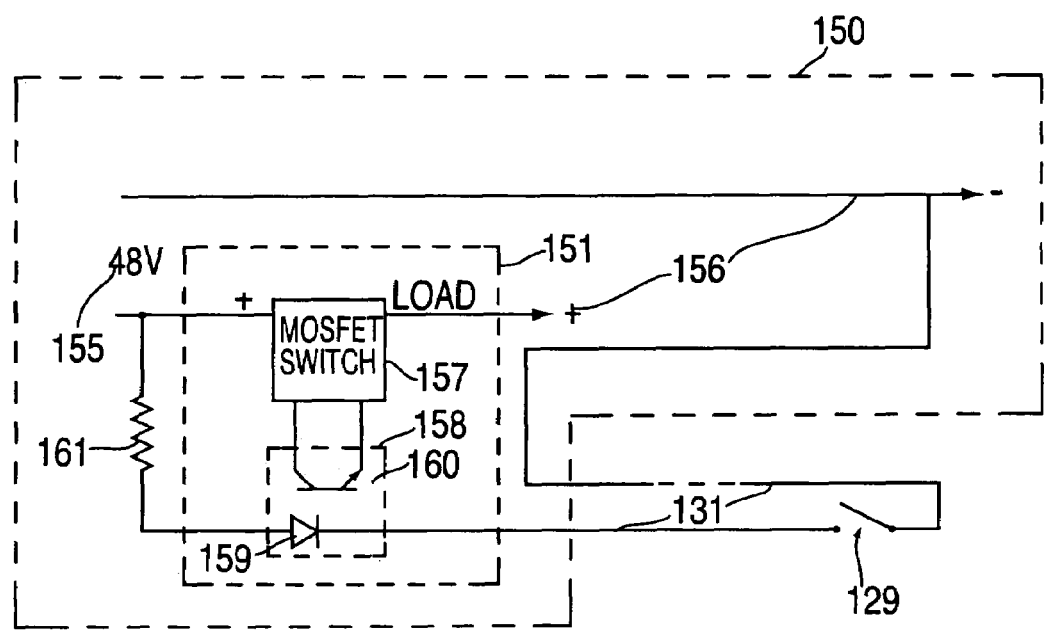

FIG. 13 shows a dual system incorporating two separate power supplies 125 with separate solar panels 126. In this system, on/off control is by a single remote switch 129 which is interfaced to master controller 140. A low-power line 143 from master controller 140 to slave controller 141 carries the control signal to the second system. In this case, clusters of halogen lamps 142 supply the lighting. Inside controllers 128, 135, 140 and 141 is an optically isolated solid-state relay 151 as shown in FIG. 14. The large dashed box 150 represents any of the four controllers from FIGS. 11-13. Note that the front end of solid-state relay 151 has optical isolator 158 which consists of LED 159 and photo transistor 160. The switching side uses a metal oxide semiconductor field effect transistor (MOSFET) 157 controlled by photo diode 160. A commercial example of "DC input/DC output" relay 151 is a Crydom model D1D40 MOSFET relay which can switch up to 40 amperes, although multiple units can be paralleled to control even higher current DC loads.

As seen in FIG. 14, opto-isolator 158 is a familiar configuration. In FIG. 14, LED 159 is supplied by the 48 VDC via dropping resistor 161, but the configuration of FIG. 10 can be used instead to supply LED 159 by a battery 77 thereby resulting in a fully isolated remote switch 129 for on/off control of these non-ballasted lighting systems. The proportional dimming circuit of FIG. 8 can also be used with these non-ballasted lighting systems by interfacing constant current driver 104 to solid state relay 151 via resistor 79 and LED 159.

It is further noted that other modifications may be made to the present invention, without departing from the scope of the invention, as noted in the appended claims.

We claim:

1. A remote switch for low-power on/off control of non-ballasted lighting, namely light emitting diodes and halogen lamps, comprising:
    a remote switch connected to at least one non-ballasted lighting unit;
    at least one power supply providing DC power;
    a controller interfacing with said remote switch communicating with said at least one non-ballasted lighting unit;
    said controller including a DC-DC converter to reduce the voltage from a predetermined voltage supplied by said at least one power supply to a second predetermined voltage required by said at least one nonballasted lighting unit.

2. The remote switch as in claim 1 wherein said at least one non-ballasted lighting unit is a light emitting diode.

3. The remote switch as in claim 1 wherein said at least one non-ballasted lighting unit is a cluster of light emitting diodes.

4. The remote switch as in claim 1 wherein said at least one nonballasted lighting unit is a halogen lamp.

5. The remote switch as in claim 1 wherein said at least one power supply is a dual system incorporating two separate power supplies with separate DC power sources, wherein on/off control is activated by a single remote switch interfaced to said controller.

6. The remote switch as in claim 5 wherein said controller is a master controller and a low-power signal line from said master controller to a servant controller thereby sends a control signal to a second system of said dual system.

* * * * *